A. STREIT.
PULLEYS FOR MACHINE-BELTS.
No. 195,672. Patented Sept. 25, 1877.
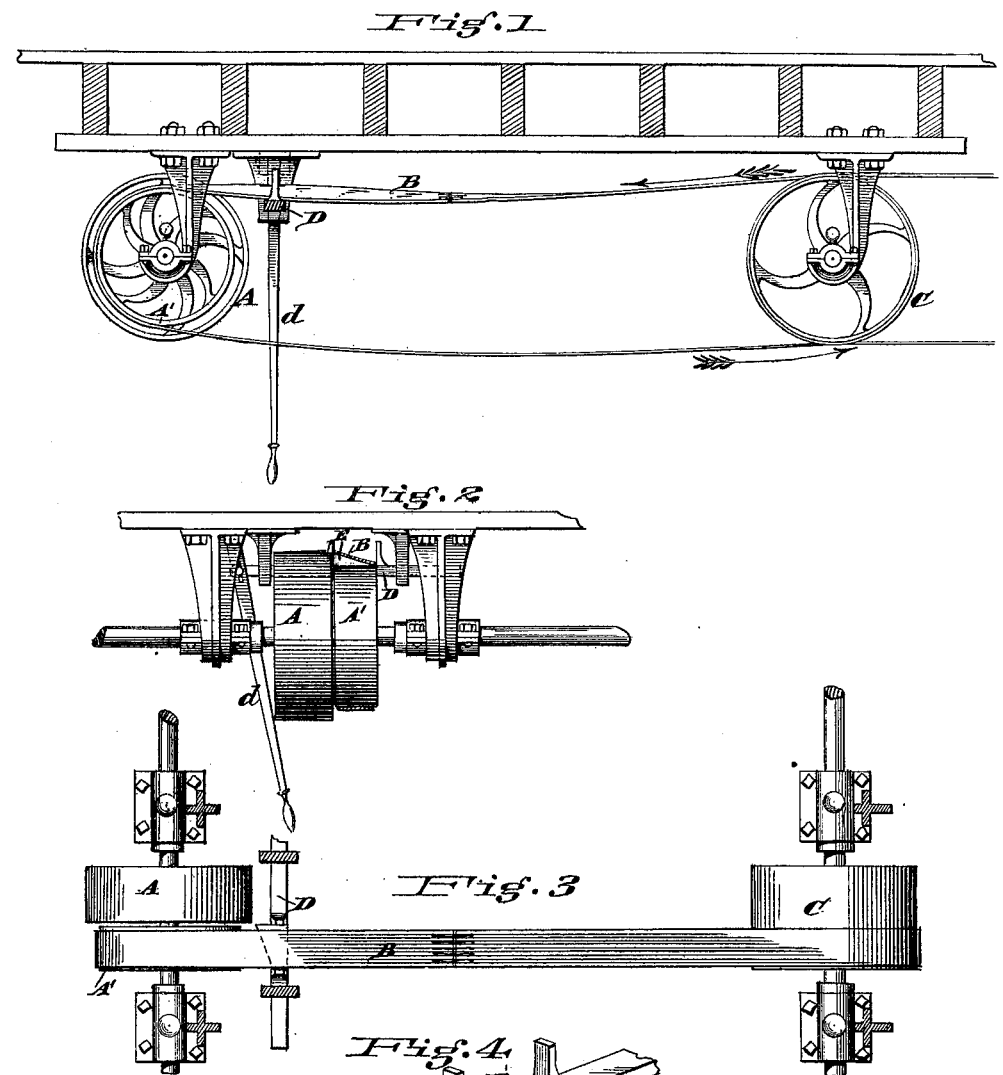

UNITED STATES PATENT OFFICE.

ANTON STREIT, OF CINCINNATI, OHIO, ASSIGNOR TO J. A. FAY & CO., OF SAME PLACE.

IMPROVEMENT IN PULLEYS FOR MACHINE-BELTS.

Specification forming part of Letters Patent No. 195,672, dated September 25, 1877; application filed August 1, 1876.

*To all whom it may concern:*

Be it known that I, ANTON STREIT, of Cincinnati, Hamilton county, State of Ohio, have invented an Improvement in Pulleys, of which the following is a specification:

My invention has for its objects the reduction of frictional wear between the loose pulley and counter-shaft of a machine, or, indeed, any shafting so provided, when said pulley is carrying the driving-belt during periods when the counter-shaft remains motionless; and my invention consists in the combination, with a tight pulley, of a loose pulley of lesser diameter and a means in the nature of an incline for guiding or leading the belt upward in shifting it from the smaller loose to the larger tight pulley.

In the accompanying drawings, Figure 1 is a side elevation of a system of pulleys and belt connection embodying my invention. Fig. 2 is an end elevation of the same. Fig. 3 is a top plan of the same. Fig. 4 is a perspective detail view.

A is the fixed pulley upon counter-shaft $a$, suspended by suitable hangers from the ceiling-timbers, as seen in the drawing.

A′ is the loose pulley, placed alongside fixed pulley A on shaft $a$, to receive the belt B therefrom when it is desirable to check the running of said shaft. The belt B connects from pulley A to driving-drum C, suitably secured by hanger to the ceiling-timbers.

D is the belt-shifting rod, operated by hand-rod $d$.

The loose pulley A′, by reference to the drawings, it will be seen, is of lesser diameter than the fixed pulley A; and evidently the belt B, which is drawn taut when running on drum C and fixed pulley A, will, when shifted to loose pulley A′, slacken and ease off the strain, owing to this decreased length of the periphery of pulley A′ over pulley A.

By this means the strain of a taut belt upon the loose pulley, as in the ordinary manner when under continued motion from the driver, (which strain rapidly wears the hub of the pulley and the shafting at the point of contact in spite of various applied methods of lubrication,) is removed, and, although the weight of the belt may be sufficient to run the loose pulley, the wear upon the shaft will be exceedingly light.

In the example illustrated I have provided the shifting-rod D, upon which the belt rests, with an inclined surface, E, whose highest and broadest surface lies contiguous to the fixed pulley A, so as to, as above described, guide the belt B toward the said pulley.

It is obvious that the inclined surface E need not be secured or formed upon the shifting-rod D, but may be secured stationary in a position in the path of the shifting of the belt from loose to fixed pulleys, so as to guide the belt incliningly upward toward the periphery of the fixed pulley; or it may be formed to extend entirely around one of the pulleys—as, for instance, on the edge of the tight pulley contiguous to the loose pulley.

Having thus described my invention, I claim—

1. The combination, substantially as specified, of a tight pulley, a loose pulley of lesser diameter, and a means in the nature of an incline for guiding the belt upward from the smaller to the larger pulley.

2. In combination with fixed and loose pulleys A A′ and belt-shifting rod D, the inclined block E, arranged to operate substantially as and for the purpose specified.

In testimony of which invention I hereunto set my hand.

ANTON STREIT.

Witnesses:
J. L. WARTMANN,
JOHN E. JONES.